(12) United States Patent
Zhang et al.

(10) Patent No.: US 10,833,911 B2
(45) Date of Patent: Nov. 10, 2020

(54) MODULATION SYSTEMS AND METHODS IN OPTICAL TRANSCEIVERS

(71) Applicant: Acacia Communications, Inc., Maynard, MA (US)

(72) Inventors: Hongbin Zhang, Holmdel, NJ (US); Mehmet Aydinlik, Acton, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/533,046

(22) Filed: Aug. 6, 2019

(65) Prior Publication Data

US 2019/0363800 A1 Nov. 28, 2019

Related U.S. Application Data

(63) Continuation of application No. PCT/US2018/017374, filed on Feb. 8, 2018.
(Continued)

(51) Int. Cl.
*H04B 10/54* (2013.01)
*H04L 27/34* (2006.01)
(Continued)

(52) U.S. Cl.
CPC ..... *H04L 27/3405* (2013.01); *H04B 10/5161* (2013.01); *H04B 10/541* (2013.01); *H04B 10/612* (2013.01); *H04L 27/3416* (2013.01); *H04L 27/3488* (2013.01); *H04L 27/36* (2013.01); *H04L 27/38* (2013.01)

(58) Field of Classification Search
CPC .......................... H04B 10/541; H04B 10/616
See application file for complete search history.

(56) References Cited

U.S. PATENT DOCUMENTS 10,326,634 B2 * 6/2019 Zhang .................... H04L 27/38
2015/0071640 A1 3/2015 Batshon et al.
(Continued)

FOREIGN PATENT DOCUMENTS

EP 3046276 7/2016
WO WO2018148374 8/2018

OTHER PUBLICATIONS

International Search Report and Written Opinion for International Application No. PCT/US2018/017374, dated May 8, 2018, 10 pages.
Alvarado et al. "Achievable Rates for Four-Dimensional Coded Modulation with a Bit-Wise Receiver" M2C.1 OFC 2014 Optical Society of America 2014 3 pgs.
(Continued)

*Primary Examiner* — Shi K Li
(74) *Attorney, Agent, or Firm* — Joseph D'Angelo

(57) ABSTRACT

Quadrature amplitude modulation (QAM) techniques for use in optical systems are described. An optical transceiver may include a modulator configured to modulate data according to a scaled set-partitioning QAM (SP-QAM) scheme. The modulator may be configured to receive a plurality of bits, associate the plurality of bits with a plurality of symbols according to the scaled (SP-QAM) scheme; and transmit the plurality of symbols over an optical channel. A demodulator in an optical receiver may receive the plurality of symbols transmitted over the optical channel and associate the received symbols with a plurality of bits according to the scaled (SP-QAM) scheme; and provide the plurality of bits to a forward error correction decoder.

21 Claims, 18 Drawing Sheets

Related U.S. Application Data

(60) Provisional application No. 62/456,411, filed on Feb. 8, 2017.

(51) Int. Cl.
  *H04L 27/36* (2006.01)
  *H04B 10/61* (2013.01)
  *H04B 10/516* (2013.01)
  *H04L 27/38* (2006.01)

(56) References Cited

U.S. PATENT DOCUMENTS

| | | | |
|---|---|---|---|
| 2015/0104186 A1* | 4/2015 | Zhang | H04L 1/006 398/135 |
| 2017/0134120 A1* | 5/2017 | Calabro | H04B 10/612 |
| 2017/0195059 A1* | 7/2017 | Rahn | H04B 10/516 |
| 2017/0250757 A1 | 8/2017 | Hatae et al. | |
| 2017/0353247 A1 | 12/2017 | Yaman et al. | |

OTHER PUBLICATIONS

Buchali et al. "Rate Adaptation and Reach Increase by Probabilistically Shaped 64-QAM: An Experimental Demonstration" Jnl Lightwave Tech vol. 234 No. 7 Apr. 2016 pp. 1599-1609.

Kojima et al. "BICM Capacity Analysis of 8QAM-Alternative Modulation Formats in Nonlinear Fiber Transmission" 2015 Tyrrhenian Int'l Workshop on Digital Comm IEEE 2015 pp. 57-59.

Rios-Muller et al. "Joint Coding Rate and Modulation Format Optimization for 8QAM Constellations Using BICM Mutual Information" W3K.4 OFC 2015 Optical Society of Am. 2015 3pgs.

Taha "Construction of Hexagonal-8-QAM Constellation and Code for OFDM" Int'l Journal of Enhanced Research in Science Technology and Engineering vol. 3 Issue 3 Mar. 2014 pp. 1-7.

Ungerboeck "Channel Coding with Multilevel/Phase Signals" IEEE Transactions on Information Theory vol. IT-28 No. 1 Jan. 1982 pp. 55-67.

Zhang et al. "Optimied BICM-8QAM Formats Based on Generalized Mutual Information" Proc. ECOC Mo.3.6.5 2015 3 pgs.

\* cited by examiner

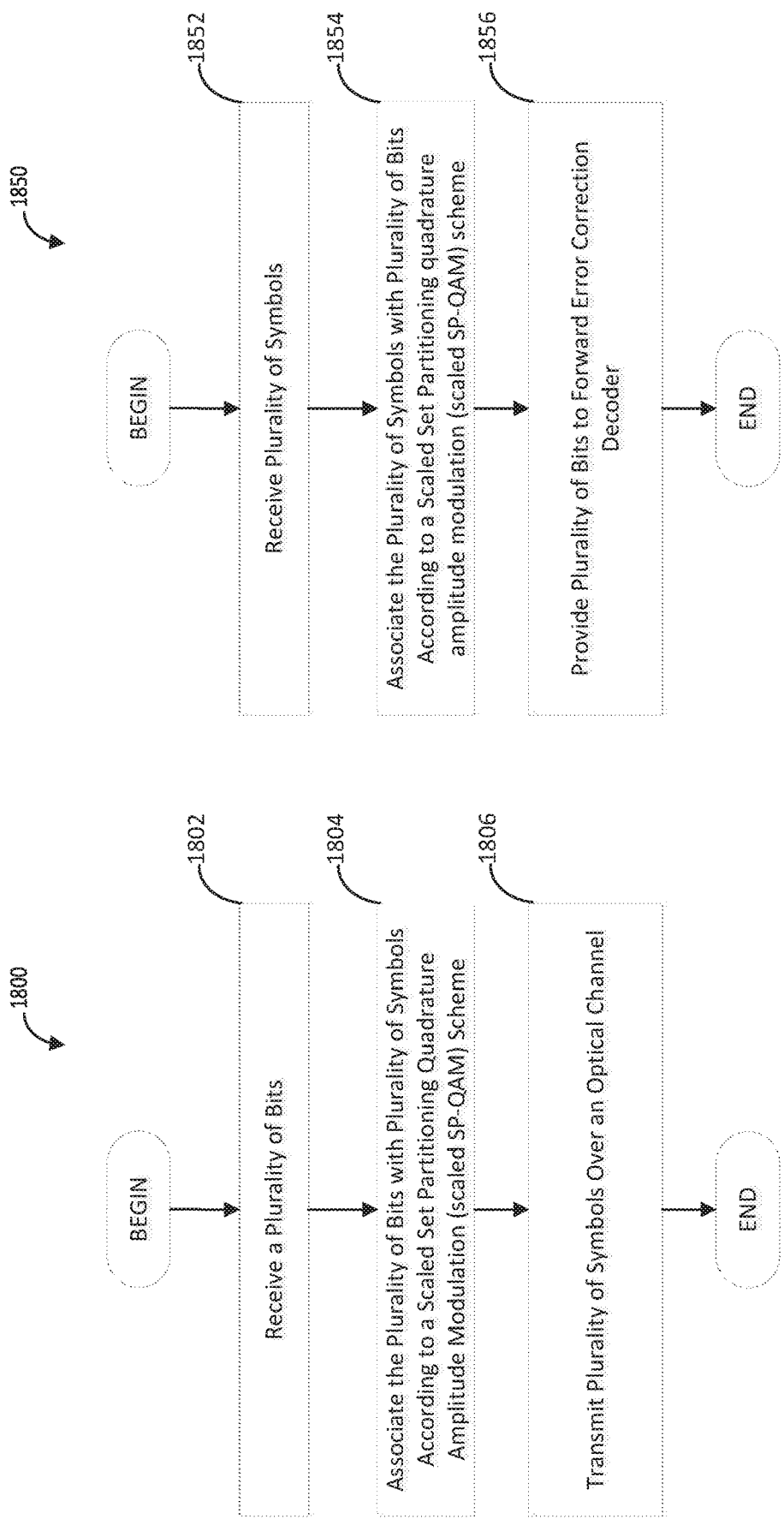

MODULATION SYSTEMS AND METHODS IN OPTICAL TRANSCEIVERS

CROSS REFERENCE TO RELATED APPLICATIONS

This application is a Continuation of International Patent Application Number PCT/US2018/017374, filed on Feb. 8, 2018 and entitled "MODULATION SYSTEMS AND METHODS IN OPTICAL TRANSCEIVERS," which claims the benefit under 35 U.S.C. § 119(e) of U.S. Provisional Patent Application Ser. No. 62/456,411 entitled "8QAM FOR OPTICAL SYSTEMS" filed on Feb. 8, 2017, which are hereby incorporated herein by reference in their entirety.

BACKGROUND

Field

The present application relates to modulation techniques in optical transceivers.

Related Art

An optical transmitter uses a modulation scheme to transmit an optical signal. A modulation scheme associates data bits with symbols. Quadrature amplitude modulation (QAM) is one example type of modulation scheme, Examples of QAM schemes include 8QAM, 16QAM, 32QAM, 64QAM, and 256QAM schemes. The notation M-QAM indicates that data bits are mapped to M different symbols. For example, in 8QAM, data bits are mapped to 8 different symbols. As another example, in 16QAM, data bits are mapped to 16 different symbols.

An M-QAM scheme may be associated with a constellation diagram having M points arranged in a two-dimensional plane. The M points represent the M possible symbols to which data bits may be mapped. For example, an 8QAM scheme may be associated with a constellation diagram having 8 points arranged in a two-dimensional plane representing the 8 possible symbols to which data bits may be mapped. Each particular one of the M points may be associated with a label indicating the bit sequence to be mapped to the symbol represented by the particular one point. For example, a particular one of the 8 points in a constellation diagram for 8QAM may be associated with a label (e.g., "010") indicating that data bits "010" are mapped to the symbol represented by the particular one point.

BRIEF SUMMARY

According to an aspect of the present application, an optical transmitter is provided. The optical transmitter comprises a modulator that is configured to receive a plurality of bits; associate the plurality of bits with a plurality of symbols according to a scaled set-partitioning quadrature amplitude modulation (SP-QAM) scheme; and transmit the plurality of symbols.

According to an aspect of the present application, an optical receiver is provided. The optical receiver comprises a demodulator that is configured to receiver a plurality of symbols; associate the plurality of symbols with a plurality of bits according to a scaled set-partitioning quadrature amplitude modulation (SP-QAM) scheme; and provide the plurality of bits to a forward error correction decoder.

According to an aspect of the present application, a method is provided. The method comprises using an optical transmitter to perform receiving a plurality of bits; associating the plurality of bits with a plurality of symbols according to a scaled set-partitioning quadrature amplitude modulation (SP-QAM) scheme; and transmitting the plurality of symbols over an optical channel.

According to an aspect of the present application, an optical transmitter is provided. The optical transmitter comprises a means for: receiving a plurality of bits, generating a modulated optical signal encoding the plurality of bits according to a scaled set-partitioning quadrature amplitude modulation (SP-QAM) scheme, and transmitting the modulated optical signal over an optical communications channel.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 18A is a flowchart of an illustrative process 1800 performed by an optical transmitter, according to a non-limiting embodiment of the present application.

FIG. 18B is a flowchart of an illustrative process 1850 performed by an optical receiver, according to a non-limiting embodiment of the present application.

DETAILED DESCRIPTION

Aspects of the present application relate to a quadrature amplitude modulation (QAM) scheme for use in optical systems. Some embodiments provide for optical transceivers configured to modulate and/or demodulate data according to a novel QAM scheme developed by the inventors termed a "scaled set-partitioning QAM" or "scaled SP-QAM" scheme herein. In some embodiments, the scaled SP-QAM scheme achieves improved performance relative to the conventional set-partitioning QAM scheme (termed "unsealed SP-QAM" scheme herein) and other conventional QAM schemes including circular QAM, star QAM, and rectangular QAM. The extent of that improvement can be quantified using various measures of performance including bit-error-rate (BER) and generalized mutual information (GMI), as shown herein.

In some embodiments, an optical transmitter is provided. In some embodiments, the optical transmitter comprises a modulator configured to associate data bits with symbols and transmit the symbols over an optical channel. In some embodiments, the modulator operates in accordance with a scaled SP-QAM n scheme developed by the inventors. For example, the modulator may be configured to associate data bits with symbols using a constellation for the scaled SP-QAM scheme. In some embodiments, the constellation for the scaled SP-QAM scheme may have one or multiple points having a non-zero offset relative to corresponding point(s) relative to the unsealed SP-QAM scheme. In some embodiments, the scaled SP-QAM scheme may be a scaled SP-8QAM scheme. For example, the modulator may be configured to associate data bits with symbols in accordance with a constellation for the scaled SP-8QAM scheme.

In some embodiments, an optical receiver is provided. In some embodiments, the optical receiver comprises a demodulator configured to associate symbols received over an optical channel with bits. In some embodiments, the demodulator operates in accordance with a scaled SP-QAM scheme developed by the inventors. For example, the demodulator may be configured to associate symbols with bits using a constellation for the scaled SP-QAM scheme.

In some embodiments, the scaled SP-QAM scheme developed by the inventors is used by an optical transmitter or receiver. In other embodiments, the novel scaled SP-QAM scheme may be used by any other suitable transmitter or receiver, as aspects of the technology described herein are not limited to using the scaled SP-QAM scheme only in the context of optical communications. For example, the scaled SP-QAM scheme described herein may be used for radio-frequency communications as part of an RF transmitter and/or an RF receiver.

The aspects and embodiments described above, as well as additional aspects and embodiments, are described further below. These aspects and/or embodiments may be used individually, all together, or in any combination of two or more, as the application is not limited in this respect.

Figure 1:
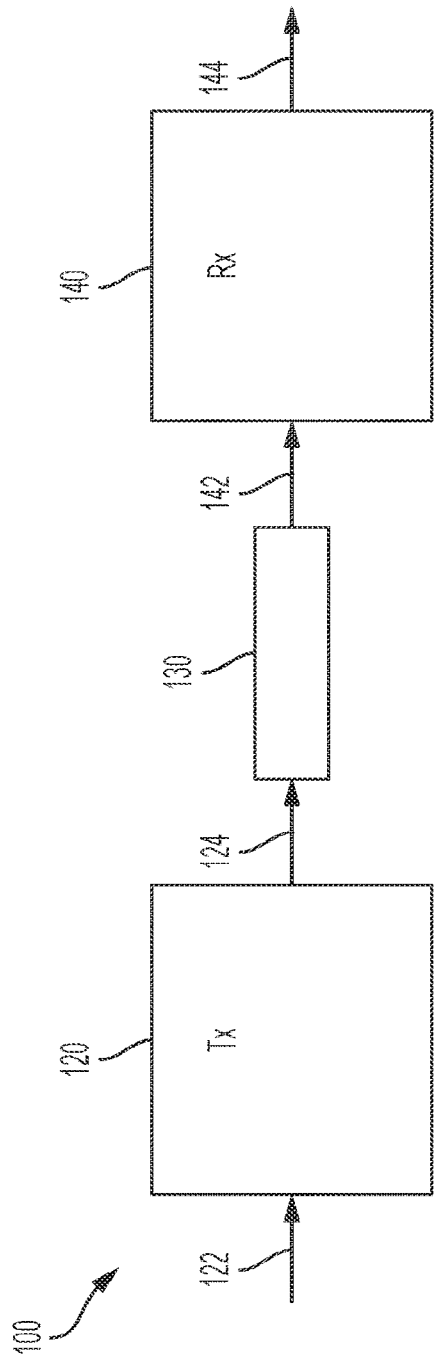
FIG. 1 is a schematic diagram of an optical system 100, according to a non-limiting embodiment of the present application.

FIG. 1 is a schematic diagram of an optical system 100, according to a non-limiting embodiment of the present application. In the illustrated embodiment, optical system 100 includes an optical transmitter 120, an optical receiver 140, and an optical communication link 130. In the illustrated embodiment, the optical transmitter 120 is configured to transmit data to optical receiver 140 over the optical communication link 130 Although not explicitly illustrated in FIG. 1, optical transmitter 120 may be an optical transceiver. Although not explicitly, illustrated in FIG. 1, optical receiver 140 may be an optical transceiver.

Returning to the illustrative embodiment of FIG. 1, optical transmitter 120 is configured to: (1) receive an input signal 122; (2) obtain symbols 124 corresponding to the input signal 122; and (3) transmit the symbols 124 to optical receiver 140 over the optical communication link 130. In the illustrative embodiment of FIG. 1, the optical transmitter 120 is configured to obtain symbols 124 corresponding to the input signal 122 in accordance with a scaled SP-QAM scheme.

In the illustrative embodiment of FIG. 1, optical receiver 140 is configured to receive symbols 142 from optical transmitter 120 over the optical communication link 130 and obtain an output signal 144 corresponding to received symbols 142. In the illustrative embodiment of FIG. 1, optical receiver 140 is configured to obtain output signal 144 corresponding to received symbols 142 in accordance with a scaled SP-QAM scheme. Although not explicitly illustrated in FIG. 1, in some embodiments, the optical receiver 140 may provide output signal 144 to a forward error correction (FEC) decoder.

Returning to the illustrative embodiment of FIG. 1, the optical system 100 is configured for long-haul transmission of the input signal 122 from the optical transmitter 120 to the optical receiver 140 over a distance of more than 2,000 km, more than 3,000 km, between 2,000 km and 8,000 km, or between 3,000 km and 6,000 km. In the illustrative embodiment of FIG. 1, optical communications link 130 is an optical waveguide (e.g., optical fiber).

Figure 2:
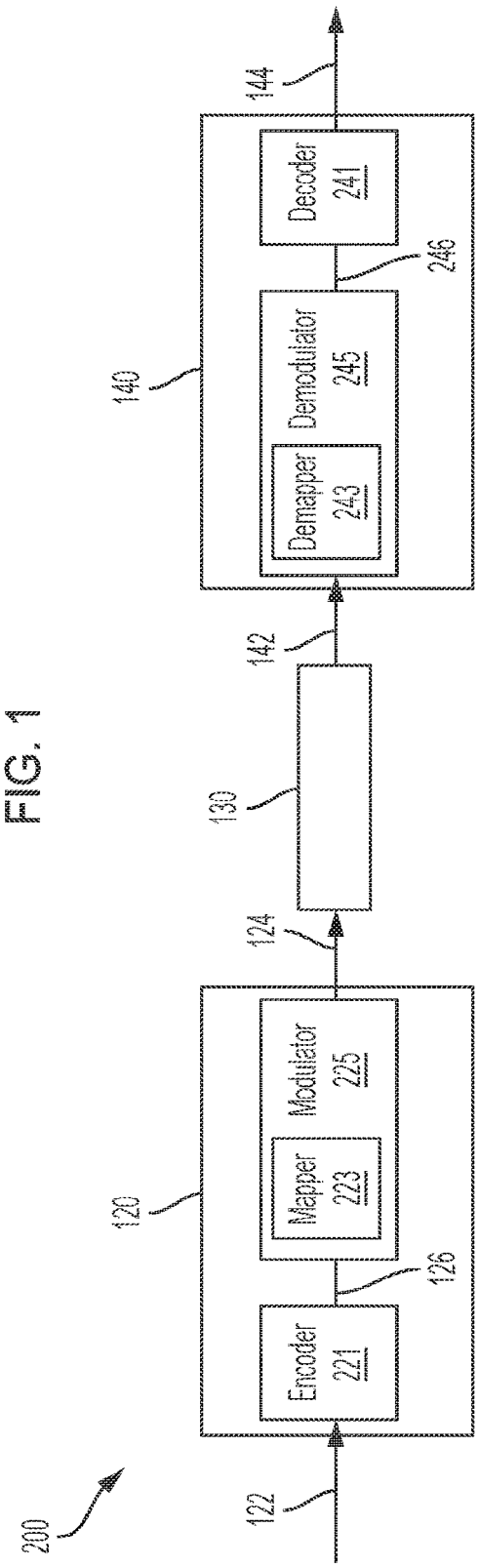
FIG. 2 is a schematic diagram of an optical system 200, according to a non-limiting embodiment of the present application.

FIG. 2 is a schematic diagram of an optical system 200, according to a non-limiting embodiment of the present application. Optical system 200 is an illustrative implementation of optical system 100 of FIG. 1. As shown in FIG. 2, optical transmitter 120 includes forward error correction encoder 221 and modulator 225. As shown in FIG. 2, modulator 225 includes mapper 223.

In the illustrative embodiment of FIG. 2, encoder 221 is configured to receive the input signal 122 and to encode the input signal 122 to generate a plurality of bits 126. Although not explicitly illustrated in FIG. 2, encoder 221 may be configured to generate a plurality of bits 126 from input signal 122 using a turbo product code (TPC), a low-density parity check code (LDPC), a Reed Solomon code, or any other suitable forward error correction code. As such, the plurality of bits 126 may include parity bits generated by the encoder 221. Although not explicitly illustrated in FIG. 2, encoder 221 may be implemented in hardware as circuitry. For example, encoder 221 may be implemented as part of an application-specific integrated circuit (ASIC).

Returning to the illustrative embodiment of FIG. 2, modulator 225 is configured to: (1) receive the plurality of encoded bits 126 from encoder 221; (2) associate the plurality of bits 126 with a plurality of symbols 124; and (3) transmit the plurality of symbols 124 over the optical communications link 130. In the illustrative embodiment of FIG. 2, modulator 225 is configured to transmit the plurality of symbols over an optical link by modulating the plurality of symbols onto a carrier light wave, which subsequently propagates over optical communications link 130.

In the illustrative embodiment of FIG. 2, mapper 223 is configured to associate the plurality of bits 126 with the plurality of symbols 124. In the illustrative embodiment of FIG. 2, mapper 223 may be configured to associate the plurality of bits 126 with symbols 124 according a scaled SP-QAM scheme (e.g., a scaled SP-8QAM) scheme. For example, mapper 223 may be configured to map the plurality of bits 126 to symbols 124 using a constellation for the scaled SP-QAM scheme.

Although not explicitly shown in FIG. 2, the constellation for the scaled SP-QAM scheme may include a plurality of constellation points with each constellation point having a location in the complex plane indicating the in-phase (I) and quadrature (Q). The constellation may further include a bit label for each of the plurality of constellation points, with a bit label for a particular constellation point indicating which sequence of bits in the plurality of bits maps to the symbol represented by the particular constellation point. Taken together, the bit labels for the constellation points specify a bit mapping for associating bits to symbols.

Although not explicitly shown in FIG. 2, the modulator 225 may be configured to associate the plurality of bits 126 to symbols 123 using a constellation, by performing the association by using stored constellation information. For example, in some embodiments, modulator 225 comprises a memory storing constellation information indicating locations of points in a scaled SP-QAM constellation and the bit labels for each of the points in the scaled SP-QAM constellation. The constellation information may be stored in any suitable format, as aspects of the technology described herein are not limited in this respect. Although not explicitly shown in FIG. 2, the memory may be part of optical transmitter 120. For example, the memory may be part of modulator 225. Also, although not explicitly illustrated in FIG. 2, modulator 225 may be implemented in hardware as circuitry. For example, modulator 225 may be implemented as part of an ASIC.

Returning to FIG. 2, optical receiver 140 includes demodulator 245 and forward error correction (FEC) decoder 241. As shown in FIG. 2, demodulator 245 includes demapper 243. In the illustrated embodiment of FIG. 2, optical receiver is a coherent optical receiver.

In the illustrated embodiment of FIG. 2, demodulator 245 is configured: (1) to receive a plurality of symbols 142 from optical communication link 130; (2) associate the received plurality of symbols 142 with a plurality of bits 246; and (3) provide the plurality of bits 246 to decoder 241. In the illustrative embodiment of FIG. 2, demapper 243 is configured to associate the plurality of symbols 142 with the plurality of bits 246. In the illustrative embodiment of FIG. 2, demapper 243 may be configured to associate the plurality of symbols 142 with the plurality of bits 246 according a scaled. SP-QAM scheme (e.g., a scaled SP-8QAM) scheme. For example, demapper 243 may be configured to map the plurality of symbols 142 to the plurality of bits 246 using a constellation for the scaled SP-QAM scheme.

Although not explicitly shown in FIG. 2, the demodulator 245 may be configured to associate the plurality of symbols 142 to bits 246 using a constellation by performing the association by using stored constellation information. For example, in some embodiments, demodulator 245 comprises a memory storing constellation information indicating locations of points in a scaled SP-QAM constellation and the bit labels for each of the points in the scaled. SP-QAM constellation. The constellation information may be stored in any suitable format, as aspects of the technology described herein are not limited in this respect. Although not explicitly shown in FIG. 2, the memory may be part of optical receiver 140. For example, the memory may be part of demodulator 245. Also, although not explicitly illustrated in FIG. 2, demodulator 245 may be implemented in hardware as circuitry. For example, demodulator 245 may be implemented as part of an ASIC.

Returning to the illustrative embodiment of FIG. 2, decoder 241 may be configured to decode a plurality of bits 246 provided from the demodulator 245 and to provide the output signal 144 based on results of the decoding. Although not explicitly shown in FIG. 2, the decoding process performed by decoder 241 may allow for accurate recovery of the original input signal 122 despite distortion induced to the transmitted signal over optical communications link 130. In some embodiments, decoder 241 may implement a forward error correction decoding algorithm.

Figure 3:
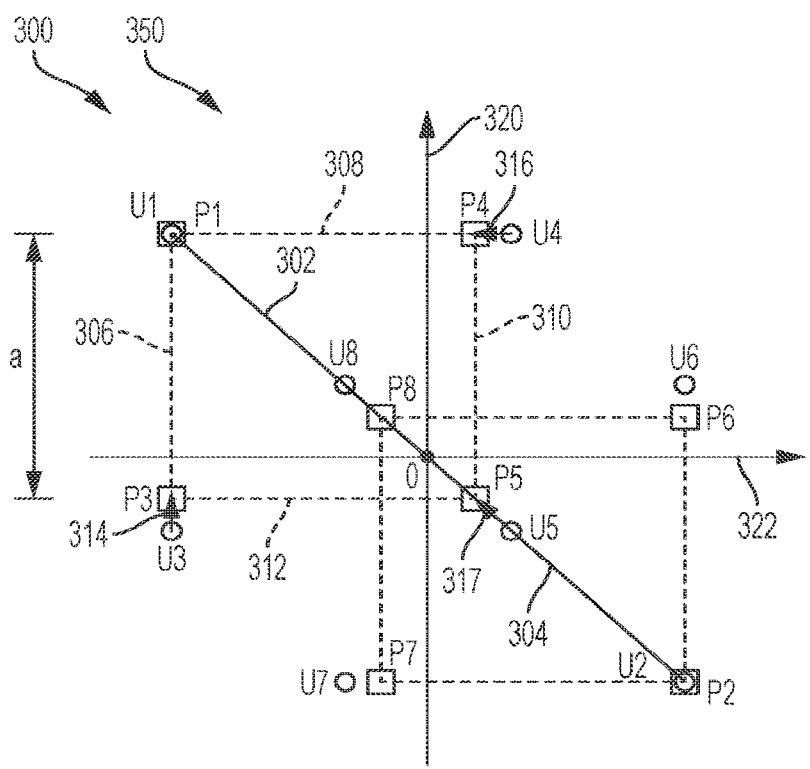
FIG. 3 is a diagram of an illustrative constellation 300 for a scaled SP-QAM scheme and a diagram of an illustrative constellation 350 for the unsealed SP-QAM scheme, according to a non-limiting embodiment of the present application.

FIG. 3 is a diagram of an illustrative constellation 300 for a scaled SP-8QAM scheme and a diagram of an illustrative constellation 350 for the unsealed SP-8QAM scheme, according to a non-limiting embodiment of the present application. As shown in FIG. 3, each of constellations 300 and 350 is arranged in a two-dimensional plane with a vertical axis along a first direction 320 and a horizontal axis along a second direction 322 that is orthogonal to the first direction 320. As shown in FIG. 3, the constellation 300 for a scaled SP-8QAM scheme includes a first set of eight points labelled P1-P8. Also, as shown in FIG. 3, the constellation 350 for the unsealed SP-8QAM scheme includes a second set of points labelled U1-U8.

As illustrated in FIG. 3, the constellation 350 is arranged as two quadrature phase-shift keying (QPSK) being offset with one another. As shown in FIG. 3, the first QPSK constellation includes points U1, U4, U5 and U3 and the second QPSK constellation includes points U2, U7, U8 and U6. As shown in FIG. 3, each of the constellations formed by U1, U4, U5 and U3, and by U2, U7, U8 and U6 is arranged in a square shape. Although not expressly shown in FIG. 3, the constellation 350 for the unsealed SP-8QAM scheme may be viewed as a set partitioning of a 16-QAM constellation.

According to some aspects of the present application, the constellation 300 for a scaled SP-8QAM scheme is a modification of the constellation 350 for the unsealed SP-8QAM scheme. This modification, also termed a scaling herein, provides improved performance over the unsealed SP-8QAM scheme both in terms of bit error rate (BER) and generalized mutual information (GMT). As shown in FIG. 3, the modification involves changing the locations of the constellation points from the locations of points U1-U8 to the locations of points P1-P8. Although not expressly shown in FIG. 3, the modification also involves changing the bit labels associated with the constellation points. The bit mapping for the scaled SP-8QAM constellation is described in further detail below with reference to FIG. 4B.

Referring hack to FIG. 3, in the constellation 300 for the scaled SP-8QAM scheme, points P1 and P2 have zero offset compared to their corresponding points U1 and U2 in the constellation 350 for the unsealed SP-8QAM scheme. As shown in FIGS. 3, P1 and P2 have the same locations as U1 and U2. The points P1 and P2 are equidistant from the origin O—they have equal Euclidean distances 302 and 304 to the origin O. The points P1 and P2 are farther away from origin O than any of the points P3-P8 of the constellation 300.

Still referring to FIG. 3, constellation 300 has a third point P3 located a first distance 306 below the first point P1 along the first direction 320, with a non-zero offset 314 between P3 and U3. A fourth point P4 is located to the right of the first point P1 along the second direction 322, with a non-zero offset 316 between P3 and U3. The distance 308 between P4 and P1 is equal to the first distance 306. A fifth point P5 has a non-zero offset 317 from point U5. Point P5 is located with a distance 310 from P4 that equals the first distance 306. Point P5 is located with a distance 312 from P3 that equals the first distance 306. As shown in FIG. 3, points P1, P4, P5 and P3 in the scaled SP-8QAM constellation may be regarded as forming a square pattern with a size a that equals the first distance 306, and with the top left corner point P1 overlapping the corresponding paint U1 of the unsealed SP-8QAM. As shown in FIG. 3, points P2, P7, P8 and P6 similarly form a square pattern with a size a that equals the first distance 306, and with the bottom right corner point P2 overlapping the corresponding point U2 of the unsealed SP-8QAM. The inventors have recognized and appreciated that when designing the arrangement of scaled SP-8QAM constellation, the size a may be adjusted such that GMI performance of the modulator is improved. The size a may be viewed as the minimum Euclidean distance of the QPSK constellation formed by points P1, P4, P5, and P3.

Figure 4A:
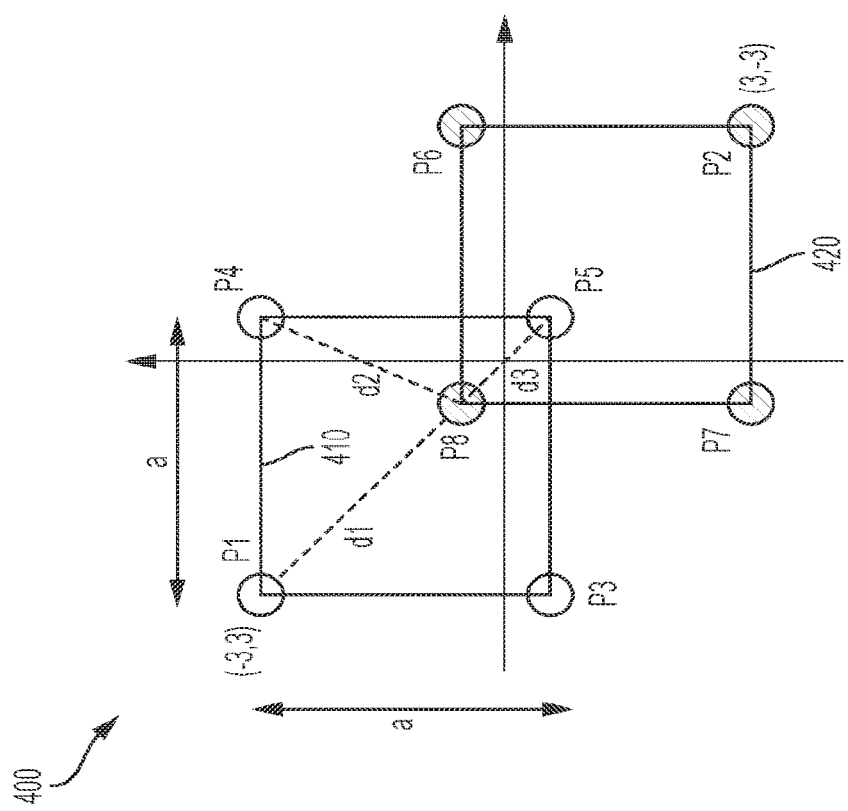
FIG. 4A is a diagram of an illustrative constellation 400 for a scaled SP-8QAM scheme, according to a non-limiting embodiment of the present application.

FIG. 4A is a diagram of an illustrative constellation 400 for a scaled SP-8QAM scheme, according to a non-limiting embodiment of the present application. The constellation 400 shown in FIG. 4A may be considered as two QPSK constellations 410 and 420 offset with each other. The QPSK constellation 410 has a left top corner P1 being fixed at (−3,3). Another QPSK constellation 420 has a right bottom corner P2 being fixed at (3,−3). It should be appreciated that in other embodiments, the left top and right bottom corners may be fixed at other locations, as aspects of the technology described herein are not limited in this respect.

As illustrated in FIG. 4A, each of the QPSK constellations 410 and 420 has a minimum Euclidean distance of a. As shown in FIG. 4A, the Euclidean distances d1, d2, and d3 between nearest neighboring points in constellation 400 is given by:

$$d1 = \sqrt{2(6-\alpha)^2},$$

$$d2 = \sqrt{(6-2\alpha)^2 + (6-\alpha)^2}, \text{ and}$$

$$d3 = \sqrt{2(6-2\alpha)^2}.$$

Although not expressly shown in FIG. 4A, in some embodiments, the value of the scaling parameter $\alpha$ may be varied to optimize the performance of the modulator. In some embodiments, the scaling parameter may be varied to optimize the performance of the modulator as reflected by the bit error rate (BER) or GMI performance metrics. Different values of the scaling parameter $\alpha$ lead to a different scaled SP-8QAM scheme even if the bit labels do not change, changing the value of $\alpha$ results in changing the locations of some of the constellation points. For example, varying the parameter $\alpha$ changes the Euclidean distance d1 between points P1 and P8 changes. In one example, when the scaling parameter $\alpha$ decreases, the distance d1 increases.

When the scaling parameter $\alpha$ is set to the value of 4, in the illustrative example of FIG. 4A, the constellation 400 for the scaled SP-8QAM scheme becomes equivalent to the constellation for the unsealed SP-8QAM scheme. On the other hand, when the scaling parameter $\alpha$ is not equal to 4, then the constellation 400 for the scaled SP-8QAM scheme is different from the constellation for the unsealed SP-8QAM scheme.

Figure 4B:
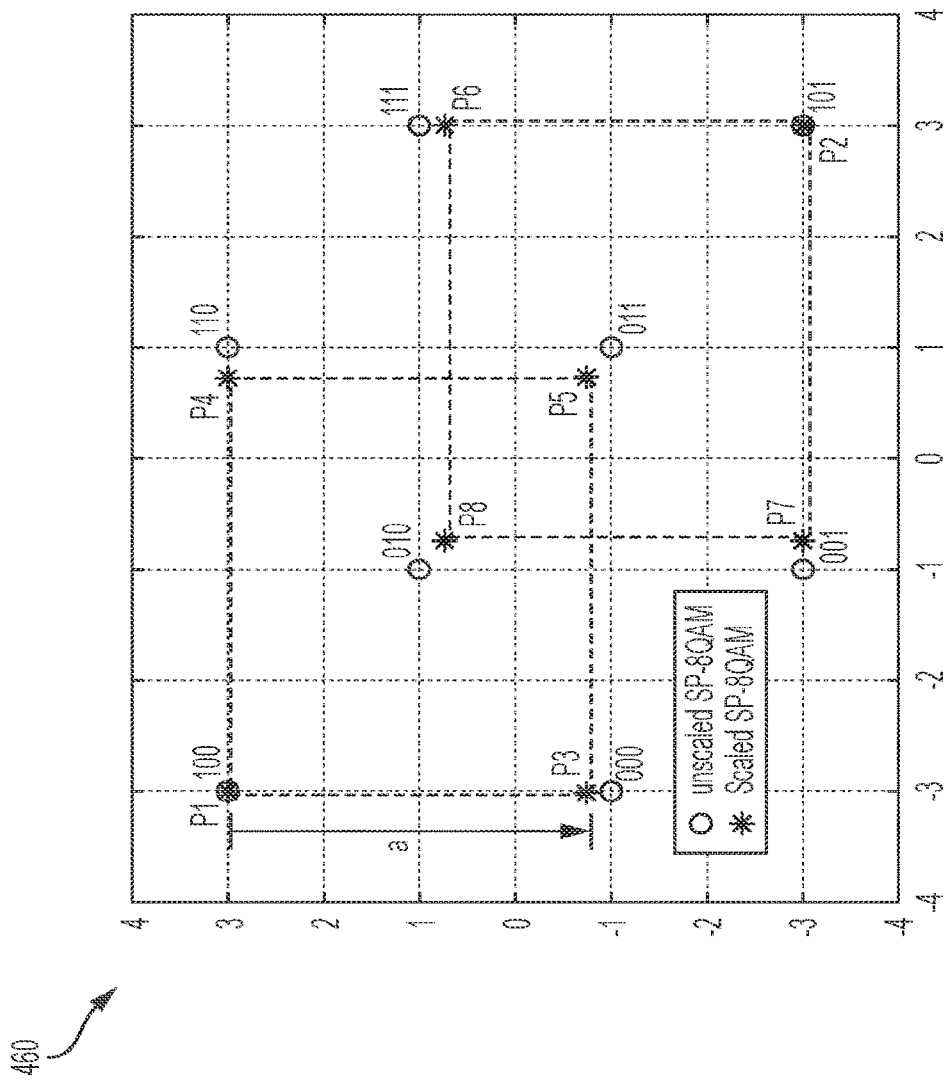
FIG. 4B is a diagram of an illustrative constellation 460 and associated bit mapping for a scaled SP-8QAM scheme, according to a non-limiting embodiment of the present application.

FIG. 4B is a diagram of an illustrative constellation 460 and associated bit mapping for a scaled SP-8QAM scheme, according to a non-limiting embodiment of the present application. Each of points P1-P8 has a corresponding bit label of 100, 101, 000, 110, 011, 111, 001 and 010, respectively.

Referring still to FIG. 4B, the scaled SP-8QAM constellation 460 is scaled by varying the Euclidean distance a, while keeping the two points P1 and P2 at the corners with a zero offset relative to the corresponding points in the unsealed SP-8QAM constellation. As a consequence, the distance between the pair of points P1, P8 having bit labels (100) and (010) increases when a decreases, which serves to reduce the symbol error. Similarly, the distance between the pair of points P2, P5 with bit labels (011) and (101) increases with the decrease of a, which also reduces the symbol error. Although the pair of points P8, P5 with bit labelling (010) and (011) has a reduced Euclidean distance when a decreases, and thus a higher symbol error rate, each of points P8, P5 generates only one bit error.

Aspects of the present application are also directed to evaluation of GMI performance in an M-QAM system, which will be discussed in detail below. Some aspects of the present application are related to using LAM to improve spectral efficiency (SE) over quadrature phase-shift keying (QPSK) modulation in optical systems for transmission over a long distance. In some embodiments, 8-ary quadrature amplitude modulation (8QAM) may provide 50% capacity increase compared to QPSK systems. In some embodiments, bit-interleaved coded modulation (BICM) without iterative decoding may be implemented. The inventors have recognized and appreciated that generalized mutual information (GMI) may be a measure of the coded performance of BICM. Aspects of the present application provide an optical system using set-partitioning quadrature amplitude modulation (SP-QAM) with a scaled SP-QAM constellation that can achieve an improved GMI performance.

According to an aspect of the present application, a bit-interleaved coded modulation (BICM) M-QAM system interleaves coded bits from n $\log_2$ M binary forward error correction (FEC) outputs before mapping into a M-QAM symbol. Such a BICM system can be viewed as n-bit independent parallel channels. Its channel capacity may be quantified using a measure of generalized mutual information (GMI) given by the following expression:

$$GMI = \Sigma_{n-0}^{n-1} I(b_i; Y),$$

where $I(b_i; Y)$ represents the mutual information between the random bits at ith position of a transmit symbol and the output of the channel. The GMT performance measure is different from the bit error rate (BER) performance measure. For example, the GMI measure makes use of the knowledge of the probability density function (PDF) of the soft metric into FEC decoders, whereas the BER measure does not do so. In some embodiments, the scaling parameter α for a scaled SP-QAM scheme is selected by optimizing the GMI performance measure rather than the BER performance measure. However, it should be appreciated that even if GMI is used select a value of a, the resultant a scaled SP-QAM scheme may outperform the corresponding unsealed SP-QAM scheme in terms of both GMT and BER, as shown herein.

Figure 5:
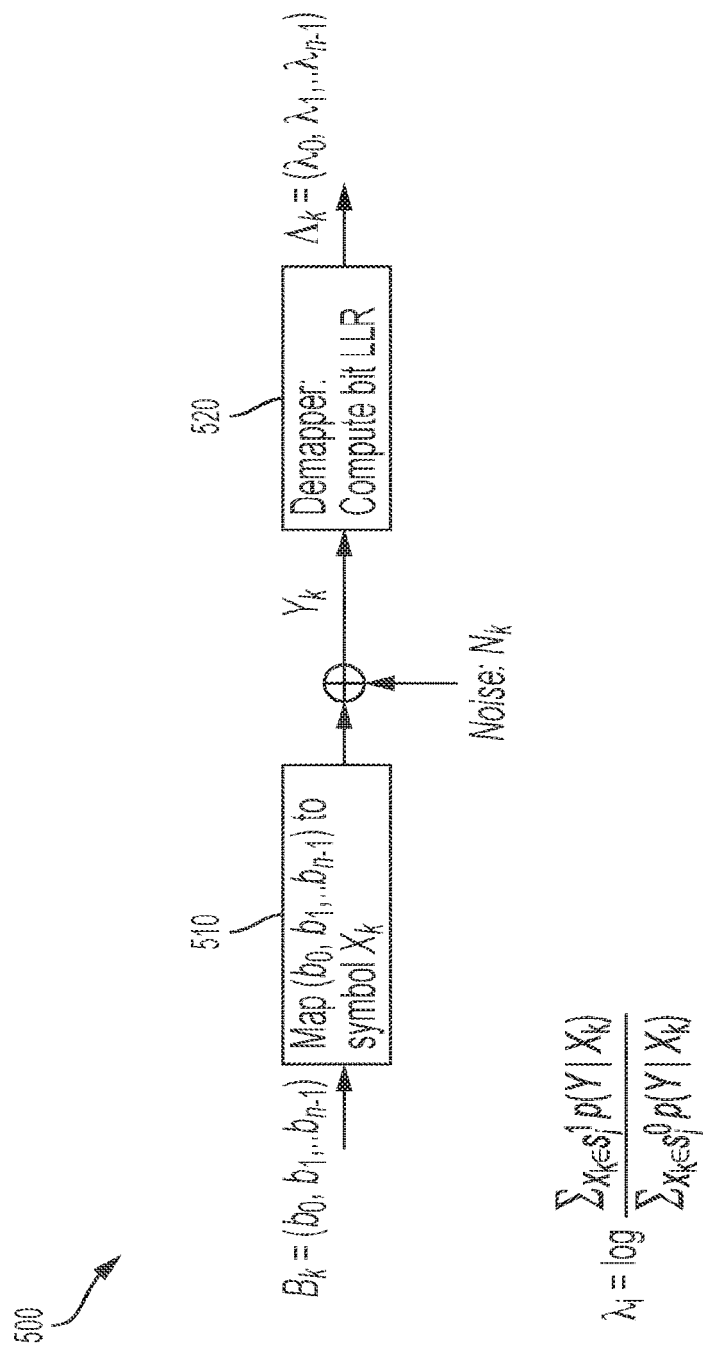
FIG. 5 is a schematic diagram illustrating an additive white Gaussian noise (AWGN) model for an exemplary BICM system 500, according to a non-limiting embodiment of the present application.

FIG. 5 is a schematic diagram illustrating an additive white Gaussian noise (AWGN) model for an exemplary BICM system 500, according to a non-limiting embodiment of the present application. As shown in FIG. 5, the BICM system 500 interleaves coded bits from one or more binary FEC encoders and maps them with a mapper 510 into a M-QAM symbol at each symbol slot k. In the receiver, a soft metric calculated as a bit log-likelihood ratio (LLR) from received data is obtained and provided as input to a FEC decoder.

Figure 6:
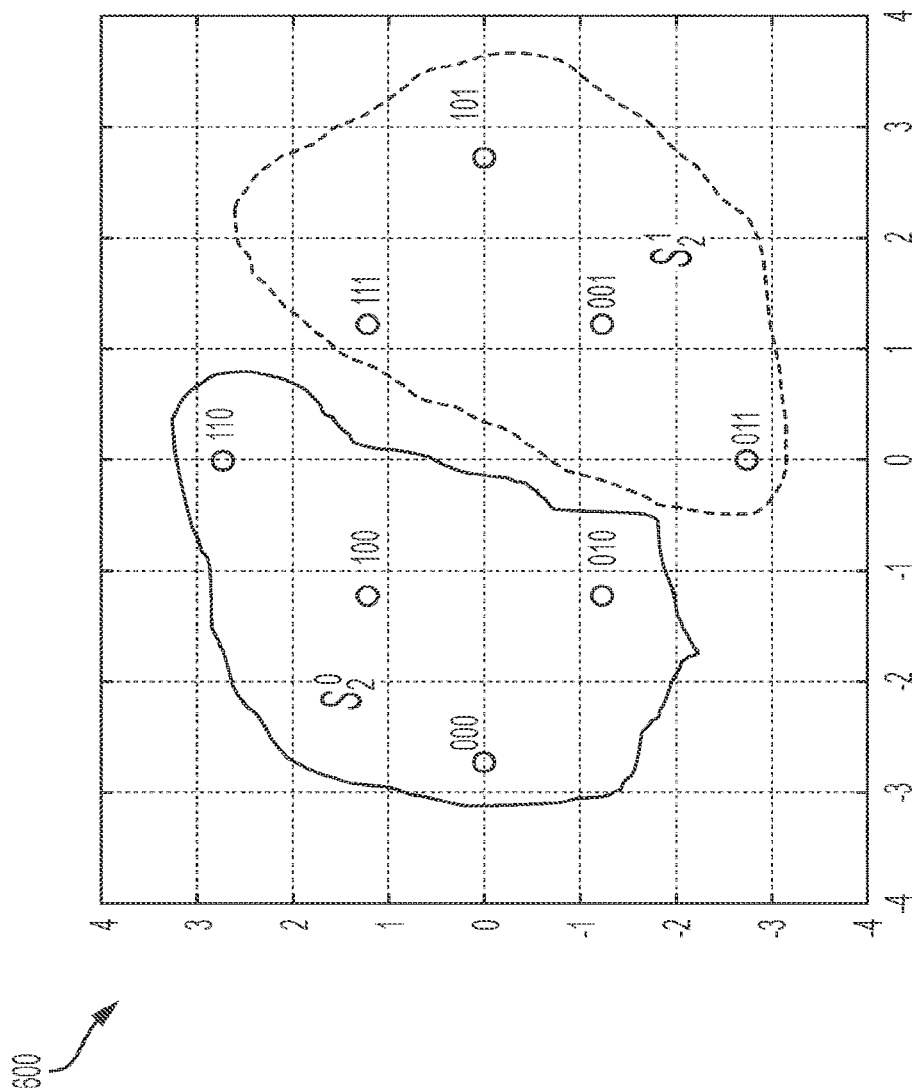
FIG. 6 is a diagram of an illustrative constellation 600, according to a non-limiting embodiment of the present application.

In the AWGN model illustrated in FIG. 5, the set $S_i^1$ represents the set of symbols whose ith bit is 1 and $S_i^0$ represents the set of symbols whose ith bit is 0. An illustrative example of $S_i^1$ and $S_i^0$ is shown in FIG. 6, which is a constellation diagram of an exemplary constellation 600, according to some aspects of the present application. Constellation 600 includes two groups of points $S_2^1$ and $S_2^0$. In the constellation 600, the points in $S_2^1$ have an associated bit label of "xy1" (each of x and y may be 0 or 1) and the symbols in $S_2^1$ have an associated bit label of "xy0."

Referring back to FIG. 5, the BICM system 500 treats each individual coded bits $b_i$, i=0, 1, . . . , n−1 independently and the BICM capacity is the sum of the mutual information between the random bits $b_i$ and the soft metric $\lambda_i$, i=0, 1 . . . , n−1 as follows:

$$GMI = \sum_{i=0}^{n-1} I(b_i; Y) =$$

$$\sum_{i=0}^{n-1} I(b_i; \lambda_i) = n + \sum_{i=0}^{n-1} \left\langle \log_2\left[\frac{p(\lambda_i \mid b_i)}{p(\lambda_i \mid b_i = 1) + p(\lambda_i \mid b_i = 0)}\right]\right\rangle_{b_i, \lambda_i}$$

where $p(\lambda_i|b_i=1)$ is the conditional probability density function of the bit LLR $\lambda_i$ when transmit bit $b_i=1$ and $p(\lambda_i|b_i=0)$ is the conditional probability density function of the bit LLR $\lambda_i$ when transmit bit $b_i=0$.

Figure 7C:
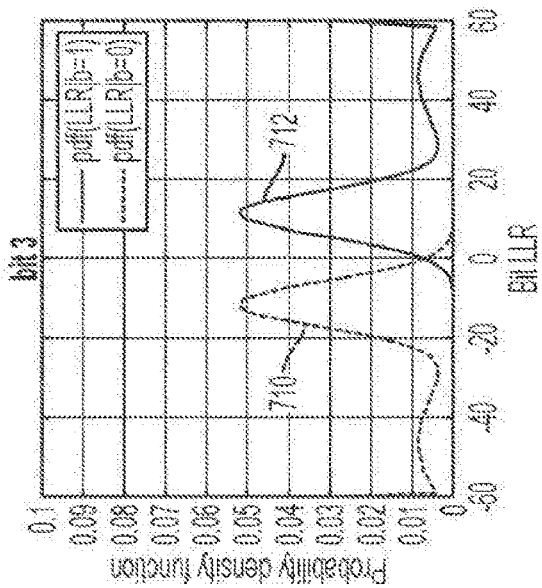
FIGS. 7A-7C illustrate exemplary log-likelihood ratio (LLR) conditional probability density functions of an unsealed SP-8QAM scheme, according to a non-limiting embodiment of the present application.
Figure 7B:
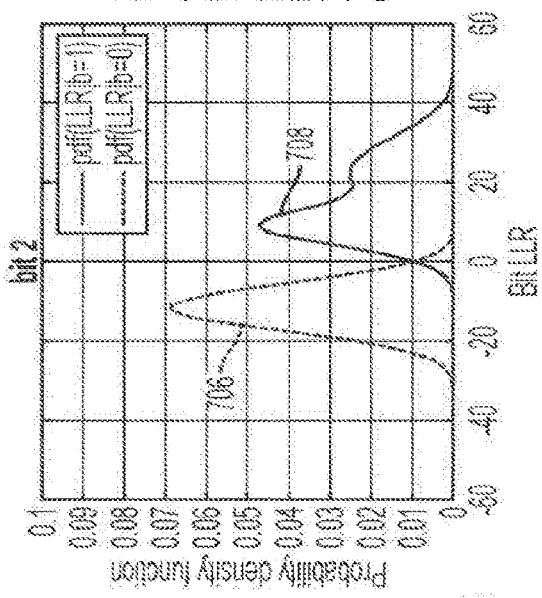
Figure 7A:
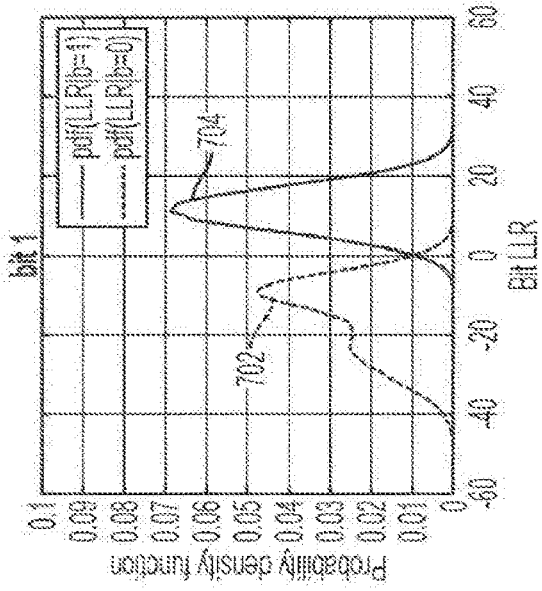

FIGS. 7A-7C illustrate exemplary log-likelihood ratio (LLR) conditional probability density functions of an unsealed SP-8QAM scheme, according to a non-limiting embodiment of the present application. The GMI performance measure described above may be used to measure the largest channel capacity that may be achieved at different SNR levels for a BICM system.

Figure 8:
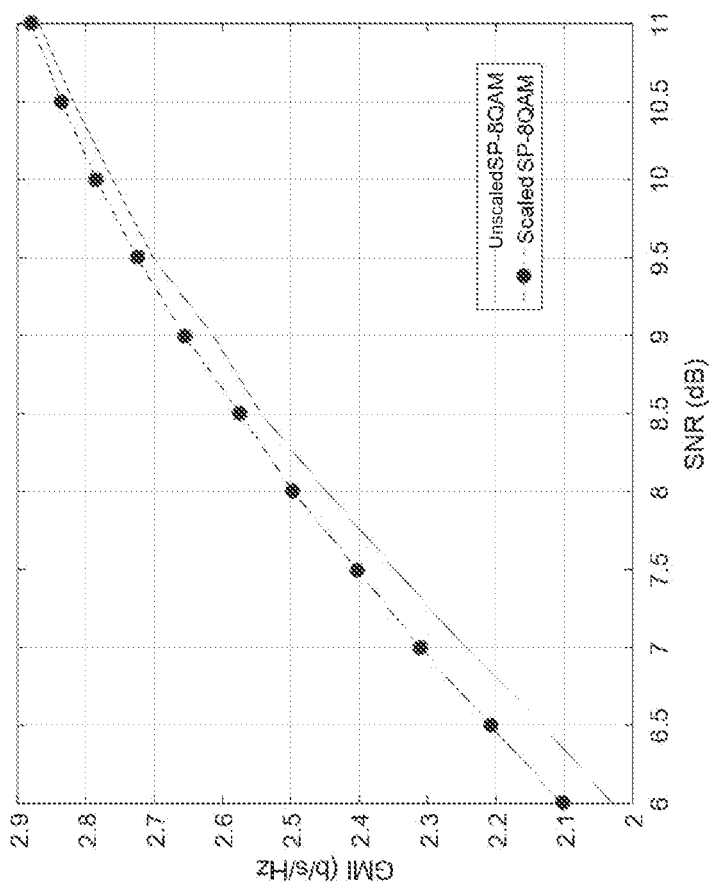
FIG. 8 illustrates the relative performance (as measured by generalized mutual information) for the scaled and unsealed SP-8QAM schemes as a function of signal-to-noise ratio (SNR), according to a non-limiting embodiment of the present application.

FIG. 8 illustrates the relative performance (as measured by generalized mutual information) for the scaled and unsealed SP-8QAM schemes as a function of signal-to-noise ratio (SNR), according to a non-limiting embodiment of the present application. As shown in FIG. 8, the scaled SP-8QAM scheme developed by the inventors outperforms (as measured by GMI) the unsealed SP-8QAM scheme for all SNR ratios, with the magnitude of the improvement increasing as SNR decreases.

Figure 9:
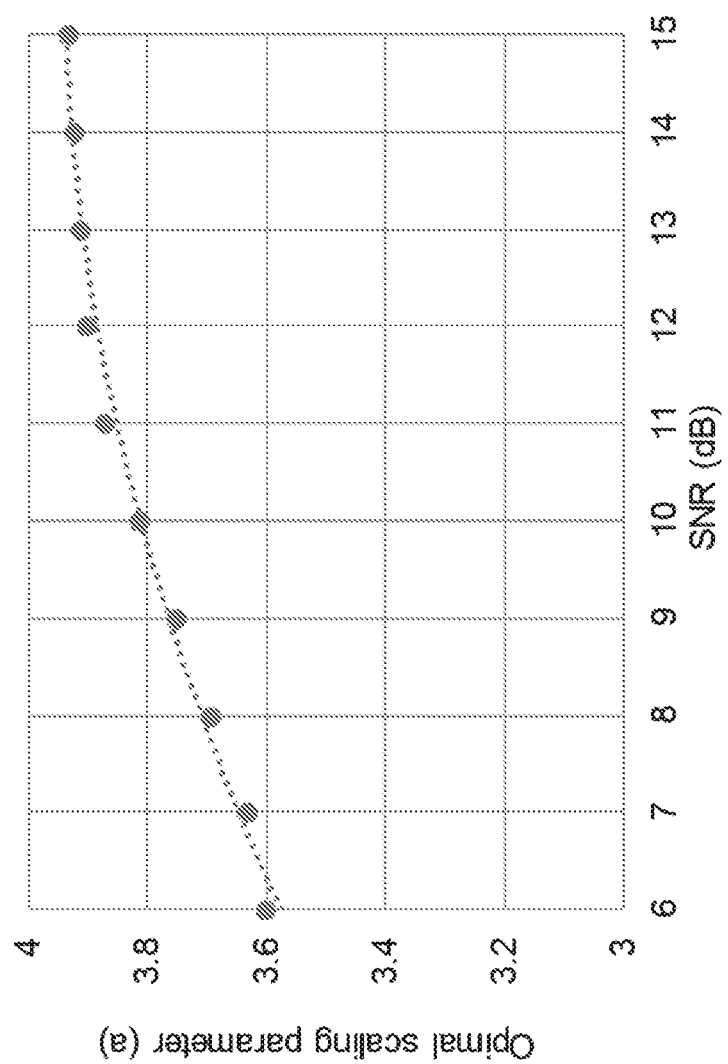
FIG. 9 illustrates optimal values for a scaling parameter of the scaled SP-8QAM scheme as a function of SNR, according to a non-limiting embodiment of the present application.

In some embodiments, the scaling parameter α of a sealed SP-QAM scheme may be selected to optimize the GMI measure of performance of the resulting modulation scheme. As shown in FIG. 9, different values of the scaling parameter α maximize GMI at different signal-to-noise ratios. For example, lower values of α may be used at lower SNR levels. Accordingly, in some embodiments, the scaling parameter α may be selected to optimize GMI at different signal-to-noise ratios.

The scaled SP-QAM scheme developed by the inventors outperforms several other QAM schemes including the star-QAM scheme, the rectangular-QAM scheme, and the circular-QAM scheme.

Figure 10B:
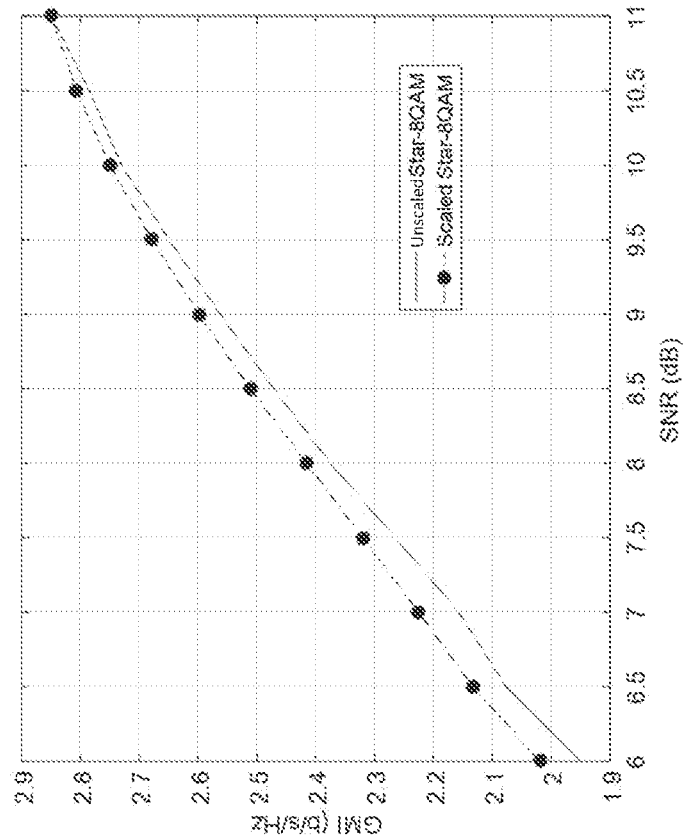
FIG. 10B illustrates the relative performance (as measured by generalized mutual information) for the scaled and unsealed Star-8QAM schemes, implemented in accordance with the constellations shown in FIG. 10A, as a function of SNR, according to a non-limiting embodiment of the present application.
Figure 10A:
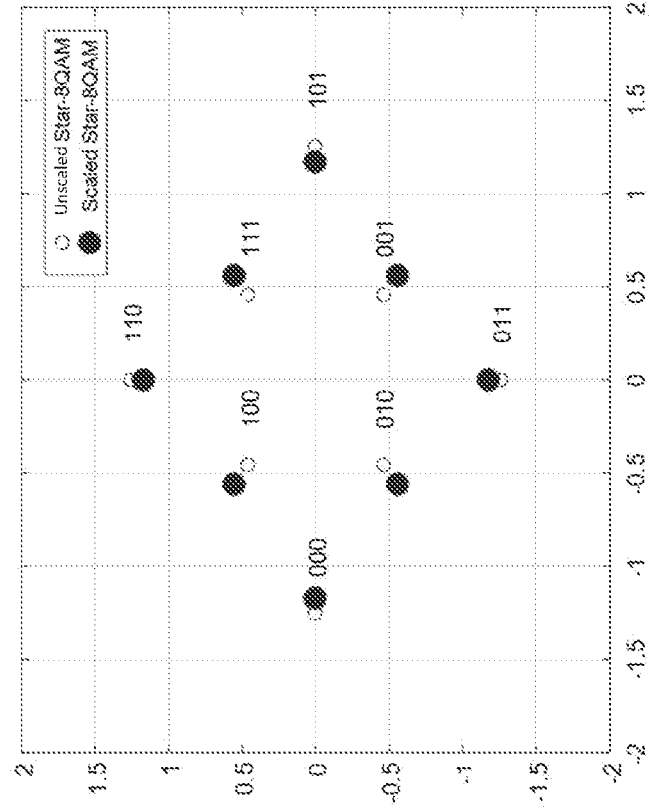
FIG. 10A is diagram of a constellation for an unsealed Star-8QAM scheme and a constellation for the scaled Star-8QAM scheme, according to a non-limiting embodiment of the present application.

FIG. 10A is diagram of a constellation for an unsealed Star-8QAM scheme and a constellation for the scaled Star-8QAM scheme, according to a non-limiting embodiment of the present application. As shown in FIG. 10A, the constellation points are arranged in a star formation. FIG. 10B illustrates the relative performance (as measured by generalized mutual information) for the scaled and unsealed Star-8QAM schemes, implemented in accordance with the constellations shown in FIG. 10A, as a function of SNR, according to a non-limiting embodiment of the present application. As shown in FIG. 10B, the scaled star-8QAM scheme outperforms (in terms of GMI) the unsealed Star-8QAM scheme.

Figures 11A, 11B:
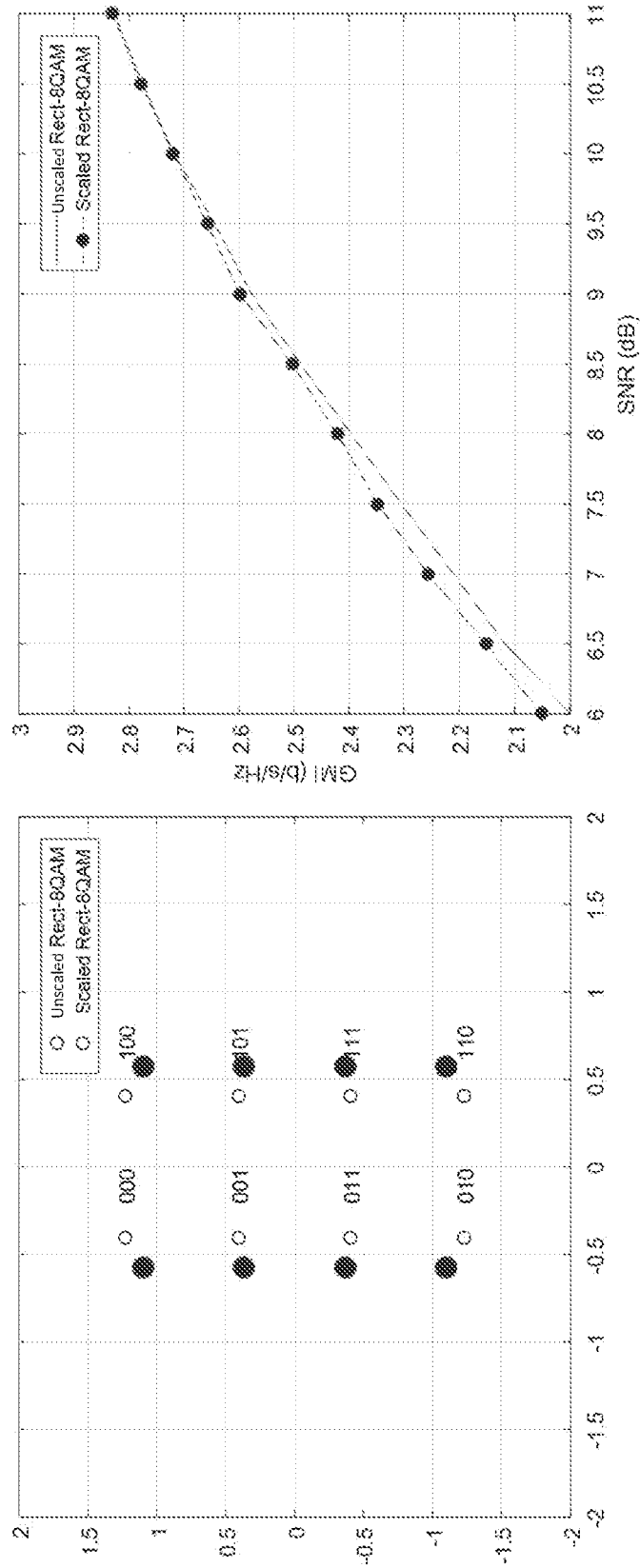
FIG. 11A is diagram of a constellation for an unsealed Rectangular-8QAM scheme and a constellation for the scaled Rectangular-8QAM scheme, according to a non-limiting embodiment of the present application.
FIG. 11B illustrates the relative performance (as measured by generalized mutual information) for the scaled and unsealed Rectangular-8QAM schemes, implemented in accordance with the constellations shown in FIG. 11A, as a function of SNR, according to a non-limiting embodiment of the present application.

FIG. 11A is diagram of a constellation for an unsealed Rectangular-8QAM scheme and a constellation for the scaled Rectangular-8QAM scheme, according to a non-limiting embodiment of the present application. As shown in FIG. 11A, the constellation points are arranged in a rectangular formation. FIG. 11B illustrates the relative performance (as measured by generalized mutual information) for the scaled and unsealed Rectangular-8QAM schemes, implemented in accordance with the constellations shown in FIG. 11A, as a function of SNR, according to a non-limiting embodiment of the present application. As shown in FIG.

11B, the scaled rectangular-8QAM scheme outperforms (in terms of GMI) the unsealed rectangular-8QAM scheme.

Figure 12A:
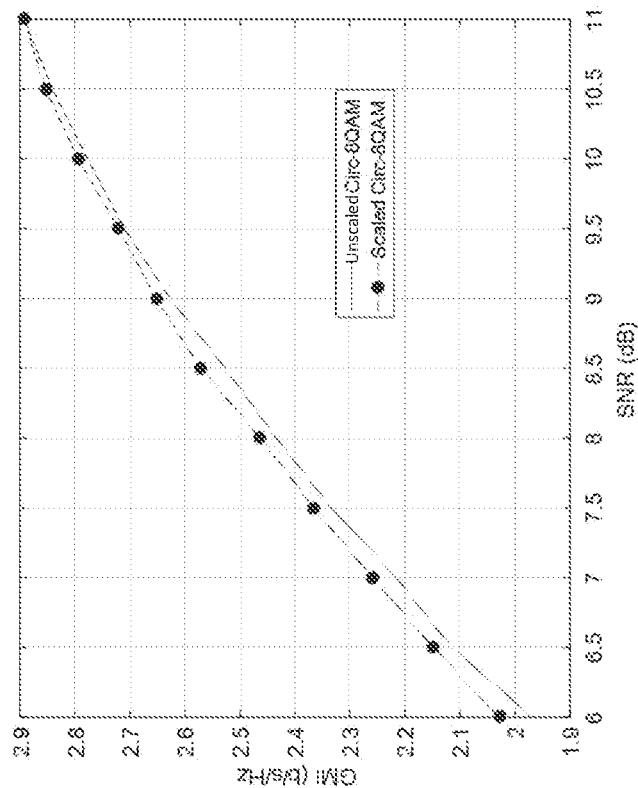
FIG. 12A is diagram of a constellation for an unsealed Circular-8QAM scheme and a constellation for the scaled Circular-8QAM scheme, according to a non-limiting embodiment of the present application.

FIG. 12A is diagram of a constellation for an unsealed Circular-8QAM scheme and a constellation for the scaled Circular-8QAM scheme, according to a non-limiting embodiment of the present application. As shown in FIG. 12A, a constellation for the unsealed circular-8QAM scheme has seven constellation points positioned around a circle and one constellation point in the center of the circle. The bit labels of neighboring points around the circle have a one-bit difference. The bit label of the constellation point at the center of the constellation differs with four other symbols by 2 or 3 bits. The scaled circular-8QAM scheme increases the Euclidean distance between the center symbol and 4 other symbols on the circle, which may provide improved performance at lower code rate. As shown in FIG. 12A, the scaled circular-8QAM scheme has four points at radius R1 from the center and four points at radius R2 from the center. Although not expressly shown in FIG. 12A, the scaling factor the scaling factor is the ratio of the radiuses R1 and R2.

Figure 12B:
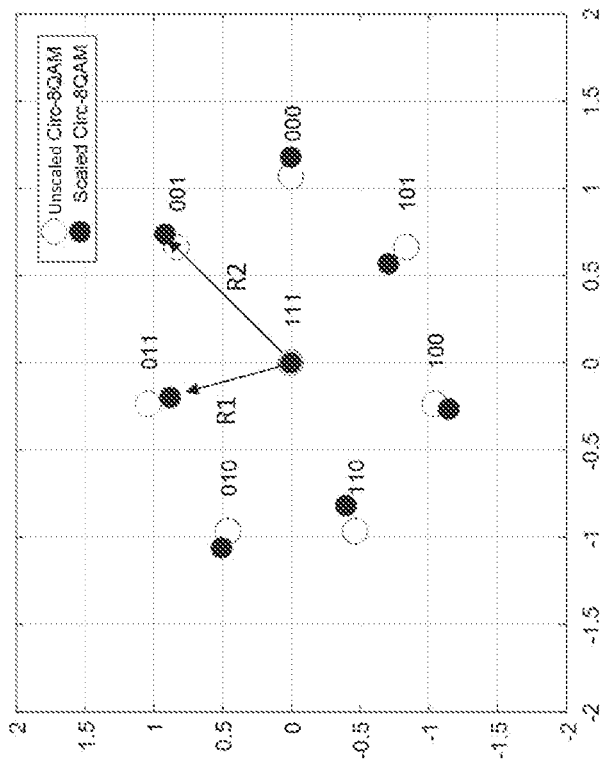
FIG. 12B illustrates the relative performance (as measured by generalized mutual information) for the scaled and unsealed Circular-8QAM schemes, implemented in accordance with the constellations shown in FIG. 12A, as a function of SNR, according to a non-limiting embodiment of the present application.

FIG. 12B illustrates the relative performance (as measured by generalized mutual information) for the scaled and unsealed Circular-8QAM schemes, implemented in accordance with the constellations shown in FIG. 12A, as a function of SNR, according to a non-limiting embodiment of the present application. As shown in FIG. 12B, the scaled circular-8QAM scheme outperforms (in terms of GMI) the unsealed circular-8QAM scheme.

Figure 13:
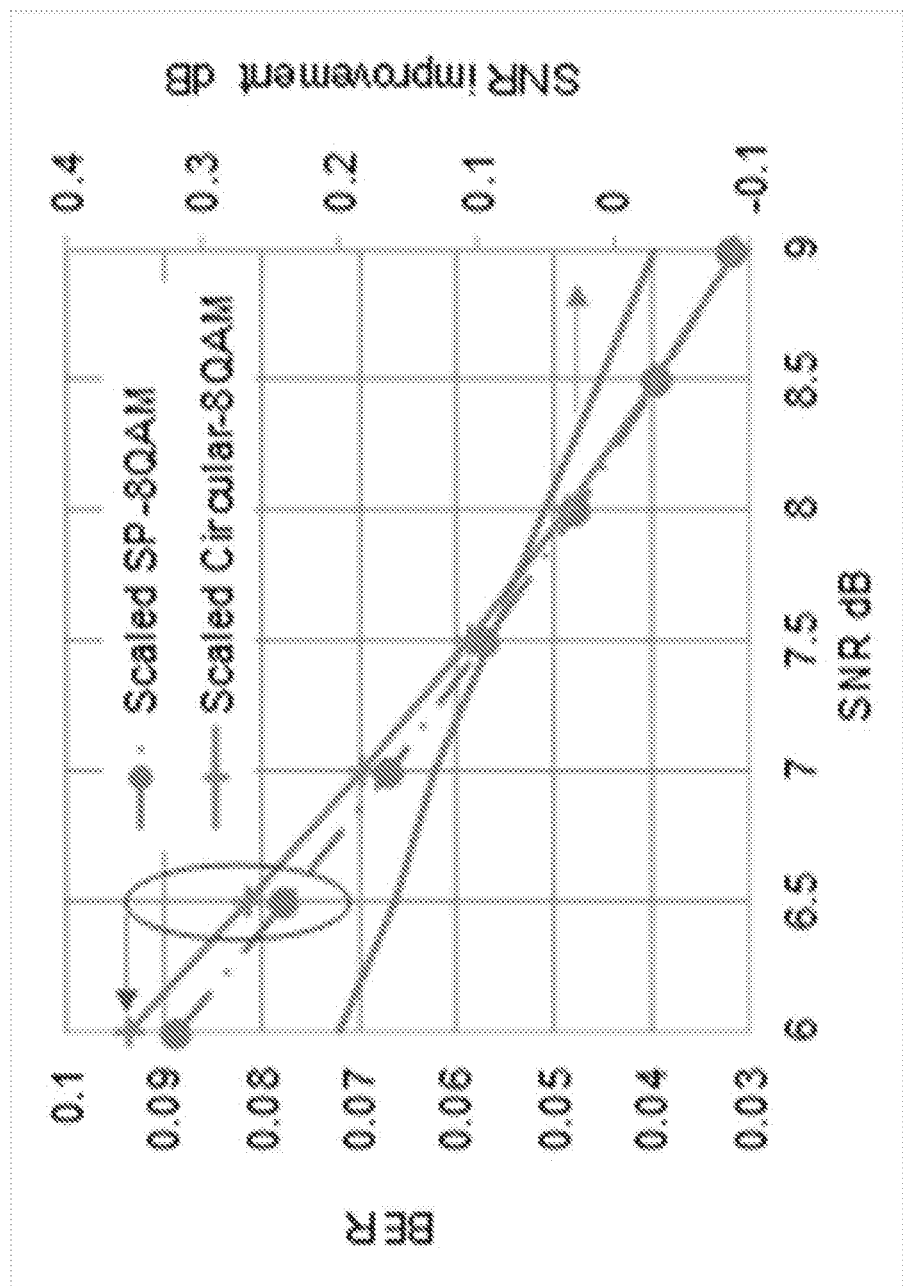
FIG. 13 illustrates the relative performance (as measured by bit error rate (BER)) for the scaled SP-8QAM scheme and the scaled circular-8QAM scheme, as a function of SNR, according to a non-limiting embodiment of the present application.

FIG. 13 illustrates the relative performance (as measured by bit error rate (BER)) for the scaled SP-8QAM scheme and the scaled circular-8QAM scheme, as a function of SNR, according to a non-limiting embodiment of the present application. As shown in FIG. 13, the scaled SP-8QAM scheme developed by the inventors outperforms the scaled circular-8QAM scheme because it has lower BER than the scaled circular-8QAM scheme. Also as shown in FIG. 13, the relative SNR improvement decreases with increasing SNR.

Figure 14:
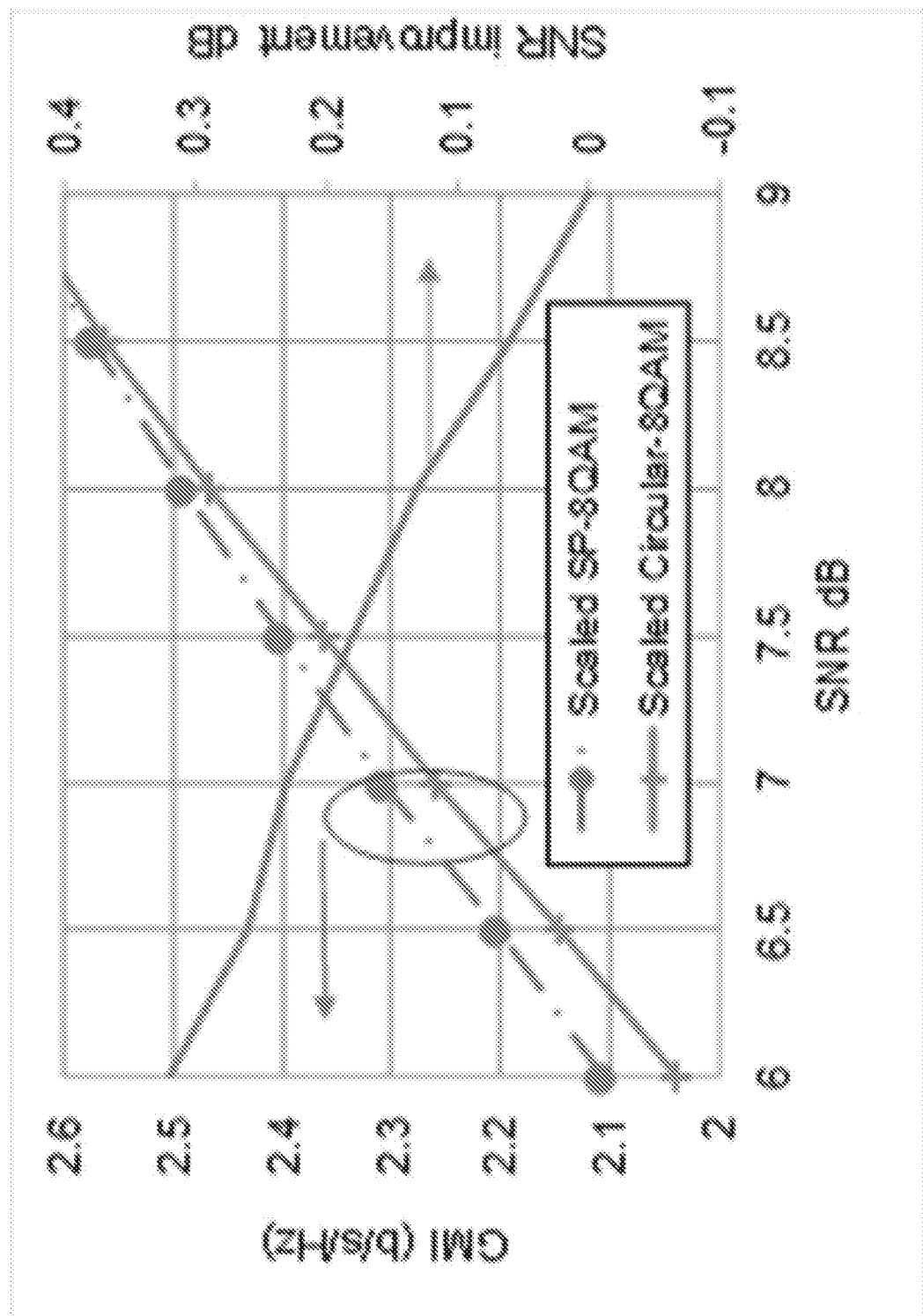
FIG. 14 illustrates the relative performance (as measured by GMI) for the scaled SP-8QAM scheme and the scaled circular-8QAM scheme, as a function of SNR, according to a non-limiting embodiment of the present application.

FIG. 14 illustrates the relative performance (as measured by GMI) for the scaled SP-8QAM scheme and the scaled circular-8QAM scheme, as a function of SNR, according to a non-limiting embodiment of the present application. As shown in FIG. 14, the scaled SP-8QAM scheme developed by the inventors outperforms the scaled circular-8QAM scheme because it has a higher GMI than the scaled circular-8QAM scheme. The magnitude of the improvement is greater for lower SNRs. Also as shown in FIG. 14, the relative SNR improvement decreases with increasing SNR.

Figure 15A:
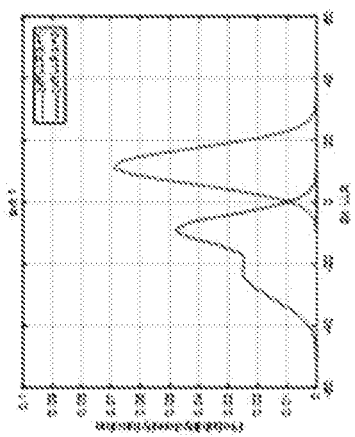
FIGS. 15A-15C illustrate exemplary LLR conditional probability density functions for the scaled SP-QAM scheme at 10 dB SNR, according to a non-limiting embodiment of the present application.
Figure 15B:
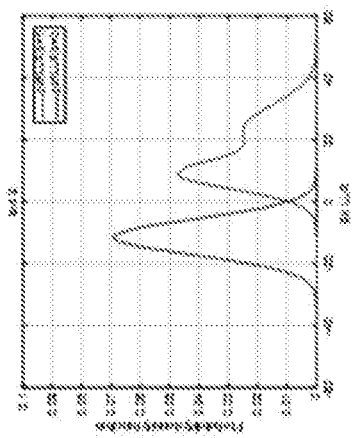
Figure 15C:
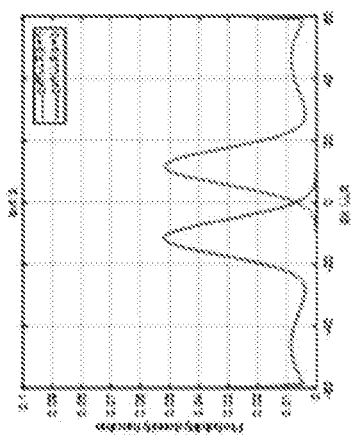
Figure 16A:
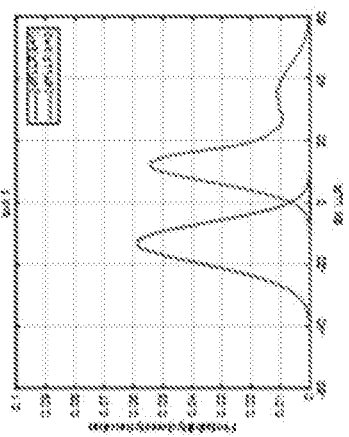
FIGS. 16A-16C illustrate exemplary LLR conditional probability density functions for the scaled Circular-QAM scheme at 10 dB SNR, according to a non-limiting embodiment of the present application.
Figure 16B:
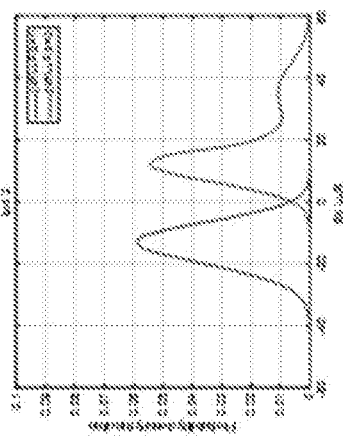
Figure 16C:
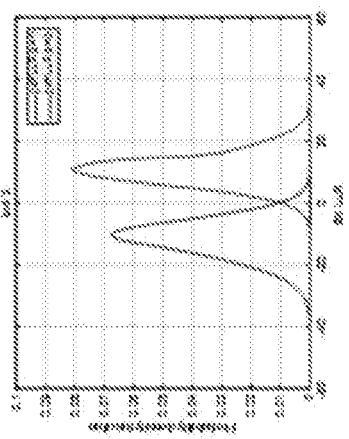

FIGS. 15A-15C illustrate exemplary LLR conditional probability density functions for the scaled SP-8QAM scheme at 10 dB SNR, according to a non-limiting embodiment of the present application. FIGS. 16A-1.6C illustrate exemplary LLR conditional probability density functions for the scaled Circular-8QAM scheme at 10 dB SNR, according to a non-limiting embodiment of the present application.

Figure 17A:
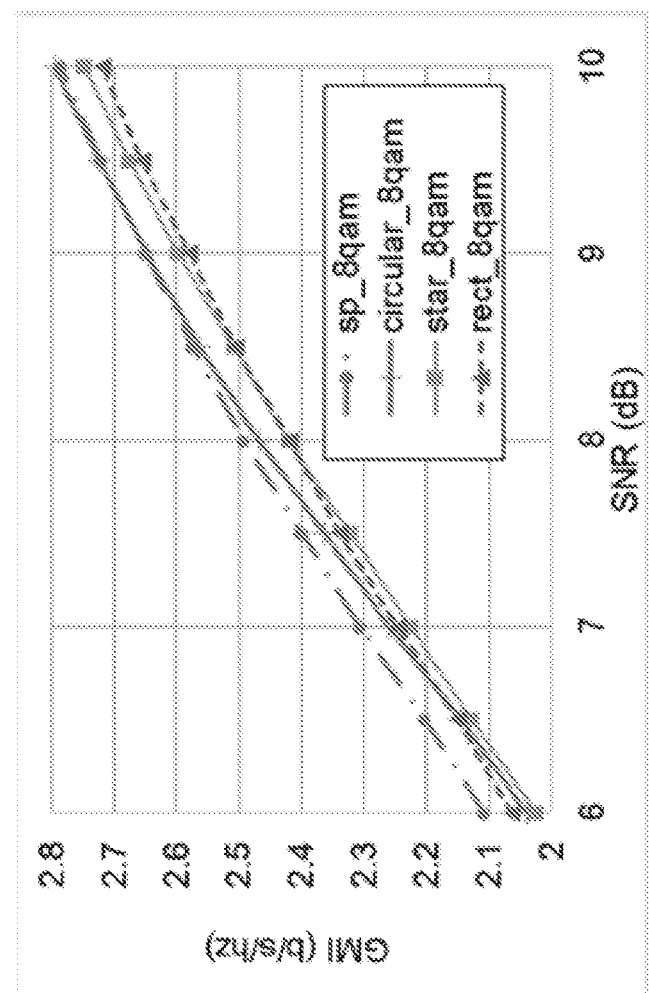
FIG. 17A illustrates the relative performance (as measured by GMI) of several scaled 8QAM schemes, according to a non-limiting embodiment of the present application.

FIG. 17A illustrates the relative performance (as measured by GMI) of several scaled 8QAM schemes, according to a non-limiting embodiment of the present application. As shown in FIG. 17, scaled SP-QAM scheme developed by the inventors outperforms (as measured by GMI) circular-8QAM, star-8QAM, and rectangular-8QAM schemes. The magnitude of that improvement is greater for lower SNRs.

Figure 17B:
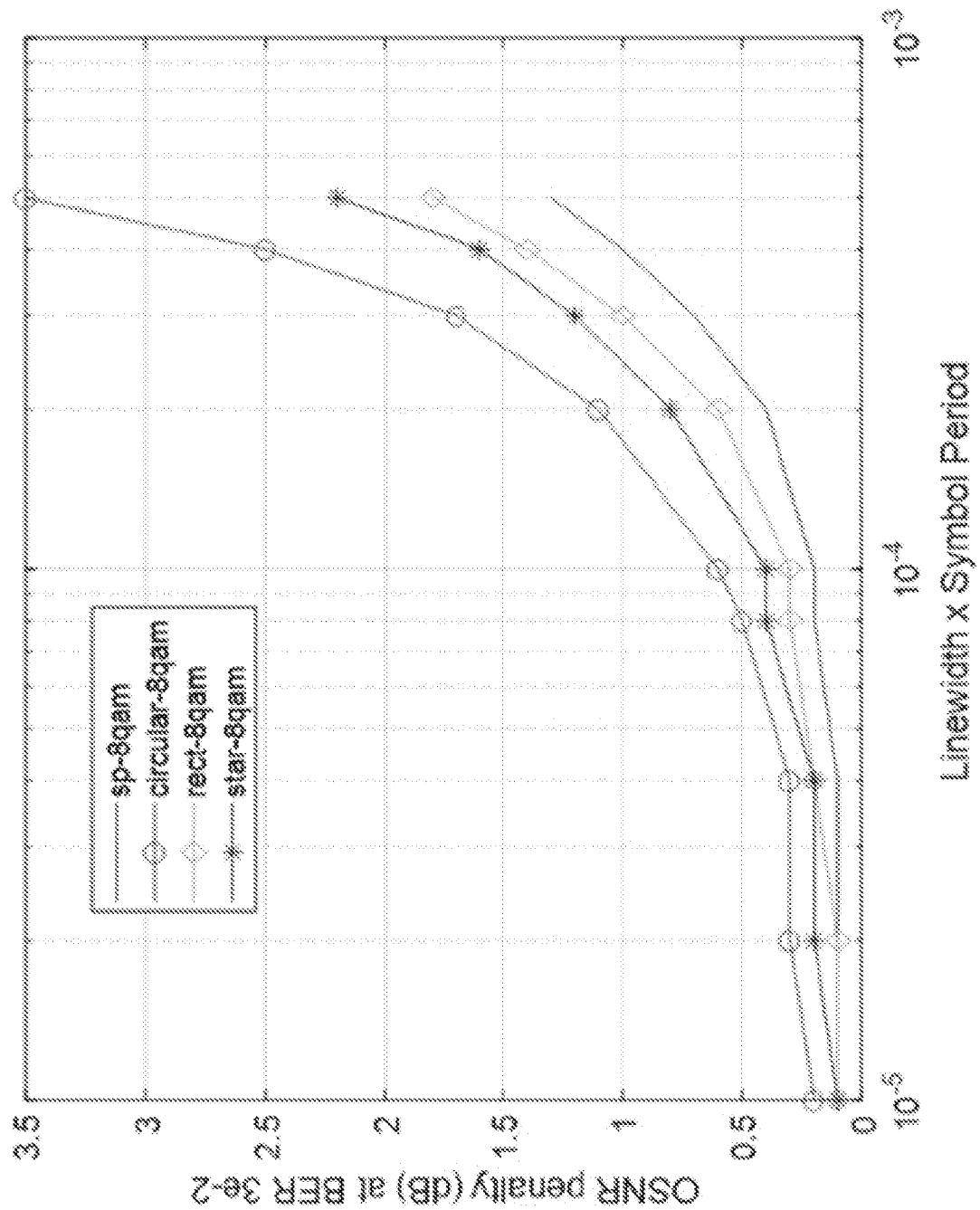
FIG. 17B illustrates the relative optical signal-to-noise ratio (OSNR) penalty of several scaled 8QAM schemes, according to a non-limiting embodiment of the present application.

FIG. 17B, illustrates the relative optical signal-to-noise ratio (OSNR) penalty of several scaled 8QAM schemes, according to a non-limiting embodiment of the present application. As shown in FIG. 17B, when compared with other 8QAM schemes, the scaled SP-8QM developed by the inventors not only has highest sensitivity but also exhibits the largest phase noise tolerance. FIG. 17B plots simulated OSNR penalty at BER of $3\times10^{-2}$ (close to 25% FEC threshold) at variable laser linewidths for 4 types of 8QAM. These simulation results are obtained using the blind phase search (BPS) algorithm, which is the optimal phase estimator. Among these 4 types of 8QAM schemes, the circular 8-QAM has the worst phase noise tolerance because of smallest phase angle between neighboring constellation points. As shown in FIG. 17B, the scaled SP-8QAM scheme developed by the inventors has the lowest OSNR penalty, especially at large laser linewidth.

FIG. 18A is a flowchart of an illustrative process 1800 performed by an optical transmitter, according to a non-limiting embodiment of the present application. For example, process 1800 may be performed by optical transmitter 120 shown in FIG. 1. At act 1802, the optical transmitter receives a plurality of bits. At act 1804, the optical transmitter associates the plurality of bits with a plurality of symbols according to a scaled SP-QAM scheme. At act 1806, the optical transmitter transmits the plurality of symbols over an optical channel. Although not explicitly shown in FIG. 18A, in some embodiments, the optical transmitter may determine the value scaling parameter for the scaled SP-QAM scheme based on an SNR of the optical channel. Next, the optical transmitter uses the scaled SP-QAM scheme with the locations of constellation points determined using the value oaf the scaling parameter.

FIG. 18B is a flowchart of an illustrative process 1850 performed by an optical receiver, according to a non-limiting embodiment of the present application. For example, process 1850 may performed by optical receiver 140 shown in FIG. 1. At act 1852, the optical receiver receives a plurality of symbols. At act 1854, the optical receiver associates the plurality of symbols with a plurality of bits according to a scaled. SP-QAM scheme. At act 1856, the optical receiver provides the plurality of bits to a forward error correction decoder.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An optical transmitter, comprising:
   a modulator configured to:
      receive a plurality of bits;
      associate the plurality of bits with a plurality of symbols using a scaled set-partitioning quadrature amplitude modulation (SP-QAM) constellation, the SP-QAM constellation comprising a set of points arranged along a first direction and a second direction orthogonal to the first direction, the set of points including:
         a first point having a same location as a corresponding first point in an unscaled SP-QAM constellation, and
         a second point spaced a first distance away from the first point along the first direction, the second point having a non-zero offset relative to a corresponding point in the unscaled SP-QAM constellation; and
      transmit the plurality of symbols; wherein a scaling factor S of the SP-QAM constellation is chosen based on a signal to noise ratio (SNR).

2. The optical transmitter of claim 1 wherein the scaling parameter is chosen to optimize performance of the modulator.

3. The optical transmitter of claim 1, wherein the modulator is configured to associate the plurality of bits with the plurality of symbols using a data structure storing information indicating locations of constellation points in the scaled SP-QAM constellation and associated bit labels.

4. The optical transmitter of claim 1, wherein each of multiple points in the set of points has a non-zero offset relative to a corresponding point in the unscaled SP-QAM constellation.

5. The optical transmitter of claim 4, wherein the scaled SP-QAM constellation is a scaled SP-8QAM constellation and the set of points comprises eight points.

6. The optical transmitter of claim 5, wherein the set of points comprises a third point having a same location as a corresponding third point in the unscaled SP-QAM constellation.

7. The optical transmitter of claim 6, wherein a first distance between the first point and an origin is equal to a second distance between the third point and the origin, and wherein the first point and the third point are farther away from the origin than any other point in the scaled SP-QAM constellation.

8. The optical transmitter of claim 6, wherein the unscaled SP-QAM constellation is an unscaled SP-8QAM constellation.

9. The optical transmitter of claim 8, wherein the set of points comprises a fourth point spaced the first distance away from the first point along the second direction, the fourth point having a non-zero offset relative to a corresponding point in the unscaled SP-8QAM constellation.

10. The optical transmitter of claim 9, wherein the set of points comprises a fifth point spaced the first distance away from the fourth point along the first direction, and spaced the first distance away from the third point along the second direction.

11. The optical transmitter of claim 8, wherein the first point is associated with a bit label of "100", the third point is associated with a bit label of "101", and the second point is associated with a bit label selected from the group consisting of "110", "000", "001", and "111".

12. The optical transmitter of claim 1, further comprising:
   a forward error correction encoder configured to receive an input signal and generate the plurality of bits.

13. The optical transmitter of claim 1, wherein the modulator is configured to transmit the plurality of symbols over an optical fiber.

14. An optical receiver, comprising:
   a demodulator configured to:
      receive a plurality of symbols;
      associate the plurality of symbols with a plurality of bits or soft metrics according to a scaled set-partitioning quadrature amplitude modulation (SP-QAM) constellation, wherein the demodulator stores constellation information indicating locations of points in a scaled SP-QAM constellation, the SP-QAM constellation comprising a set of points arranged along a first direction and a second direction orthogonal to the first direction, the set of points including:
         a first point having a same location as a corresponding first point in an unscaled SP-QAM constellation, and
         a second point spaced a first distance away from the first point along the first direction, the second point having a non-zero offset relative to a corresponding point in the unscaled SP-QAM constellation; and
      provide the plurality of bits to a forward error correction decoder.

15. The optical receiver of claim 14,
   wherein the scaled SP-QAM constellation is a scaled SP-8QAM constellation, the unscaled SP-QAM constellation is an unscaled SP-8QAM constellation, and the set of points comprises eight points, with each of multiple points in the set having a non-zero offset relative to a corresponding point in the unscaled SP-8QAM constellation.

16. The optical receiver of claim 15,
   wherein the set of points comprises a third point having a same location as a corresponding third point in the unscaled SP-8QAM constellation, and
   wherein the second point has a non-zero offset relative to a corresponding point in the unscaled SP-8QAM constellation.

17. A method, comprising:
   using an optical transmitter to perform:
      receiving a plurality of bits;
      associating the plurality of bits with a plurality of symbols using a scaled set-partitioning quadrature amplitude modulation (SP-QAM) constellation, the SP-QAM constellation comprising a set of points arranged along a first direction and a second direction orthogonal to the first direction, the set of points including:

a first point having a same location as a corresponding first point in an unscaled SP-QAM constellation, and a second point spaced a first distance away from the first point along the first direction, the second point having a non-zero offset relative to a corresponding point in the unscaled SP-QAM constellation; and transmitting the plurality of symbols over an optical channel; wherein a scaling factor S of the SP-QAM constellation is chosen based on a signal to noise ratio (SNR).

18. The method of claim 17, wherein each of multiple points in the set of points has a non-zero offset relative to a corresponding point in the unscaled SP-QAM constellation.

19. The method of claim 17, wherein the scaled SP-QAM constellation has an offset parameter, and wherein the method further comprises:

prior to the associating, determining the offset parameter based on a signal-to-noise ratio (SNR) of the optical channel.

20. The optical receiver of claim 14 wherein a scaling factor S of the SP-QAM constellation is chosen based on a signal to noise ratio (SNR).

21. The optical receiver of claim 14 wherein the soft metric is calculated as a bit log-likelihood ratio (LLR).

* * * * *